United States Patent Office 3,019,223
Patented Jan. 30, 1962

3,019,223
DEODORIZATION OF CYANURIC CHLORIDE
Edward H. Sheers, Kew Gardens Hills, N.Y., assignor to American Cyanamid Company, New York, N.Y., a corporation of Maine
No Drawing. Filed Oct. 25, 1960, Ser. No. 64,742
6 Claims. (Cl. 260—248)

The present invention relates to a novel method for the deodorization of an odoriferously offensive organic substance. More particularly, it is concerned with the deodorization of cyanuric chloride.

Crude cyanuric chloride, chemically designated as 2,4,6-trichloro-1,3,5-triazine, is a well-known chemical of commerce. It finds utility, amongst others, as a valuable intermediate in the chemical industry for the preparation of diverse products such as dyestuffs, food and resins. Unfortunately, cyanuric chloride suffers from a major drawback due to its manufacture. It possesses a strong odor resembling that of mouse excrement. Accordingly, expensive exhaust equipment is generally employed where large quantities of cyanuric chloride are being utilized. Further, its use is severely limited, for instance, in the food industry where it is employed as a cross-linking agent for starch. It would, therefore, be highly desirable that a process could be provided to effect deodorization of cyanuric chloride in a straightforward and economical manner.

It is, therefore, a principal object of the present invention to provide a process for the deodorization of cyanuric chloride. It is a further object of the present invention to provide a deodorization process for cyanuric chloride whereby the deodorization is carried out in an economical and straightforward manner. Other objects and advantages will become apparent from a consideration of the present specification.

To this end, cyanuric chloride is directly treated with a deodorization compound by dissolving cyanuric chloride in an inert organic solvent and incorporating therein a deodorization reagent, such as ketene or acetic anhydride. A deodorized, premium grade cyanuric chloride is readily recovered.

According to the present invention, crude cyanuric chloride is dissolved in an anhydrous inert organic solvent and either ketene or acetic anhydride in small amounts is added thereto. Resultant mixture is agitated and the solvent is thereafter evaporated. Recovered crystalline cyanuric chloride no longer possesses its initial obnoxious odor, but rather possesses the characteristic strong acidic odor which is normally attributable to compounds characterized by the acidic cyanuric chloride structure.

Illustrative of the anhydrous inert organic solvents useful in the practice of the present invention are: acetone, benzene, carbon tetrachloride, dioxane, nitrobenzene and chloroform. In general, it is preferred to employ anhydrous acetone, since it is readily available and the solubility of cyanuric chloride therein is relatively high.

Small amounts of ketene or acetic anhydride as the deodorization reagent can advantageously be employed. Usually, from about 0.1 percent to about 10 percent of the deodorization reagent, based on the weight of cyanuric chloride, may be incorporated therein. In general, it has been found that from about one percent to about five percent is sufficient to accomplish the removal of obnoxious odors from crude cyanuric chloride. Thus, when ketene is employed, it is bubbled into the mixture comprising dissolved cyanuric chloride and its addition is terminated after a required and sufficient amount of ketene is dispersed in the mixture. Gaseous ketene is thus passed into the treating solution and excess gas will be readily eliminated. However, acetic anhydride may also be utilized as the deodorization reagent. When the latter is employed, the odor of acetic acid pervades the desired product. Recovered cyanuric chloride is now free from the odor resembling that of mouse excrement.

For some purposes, the odor of acetic anhydride is undesirable and, therefore, cannot be universally employed even where minute amounts are used. Accordingly, it is a preferred embodiment of the invention to employ ketene, particularly where the utilization of a deodorized cyanuric chloride is required for the food industry.

The following examples are presented as illustrative of the process of the invention. These examples are not to be taken as limitative of the invention. Unless otherwise noted, parts given are by weight.

*Example 1*

To a suitable reaction vessel are added 25 parts of cyanuric chloride and 100 parts of anhydrous acetone. The mixture is agitated and to the latter is added one part of ketene. The addition of ketene is accomplished by passing the gas slowly through the cyanuric chloride-acetone mixture. Addition of ketene occurs within approximately five minutes. Thereafter, the solvent is evaporated under vacuum and resultant crystalline cyanuric chloride is obtained. The recovered crystals have a strong acidic, but otherwise pleasant aroma devoid of obnoxious, malodorous mouse excrement.

*Example 2*

7.5 parts of cyanuric chloride are dissolved in 100 parts of carbon tetrachloride and the solution is added to a suitable reaction vessel. 0.3 part of acetic anhydride is added to the resultant solution and the latter is then stirred with mechanical agitation.

Stirring is discontinued after ten minutes and the resultant mixture is evaporated to remove any solvent. Resultant crystalline cyanuric chloride is thereafter removed from the reaction vessel and is found to possess a strong acidic odor characteristic of acetic acid.

I claim:

1. A process for preparing an improved cyanuric chloride free from obnoxious and offensive odors which comprises the steps of: dissolving crude cyanuric chloride in an anhydrous inert organic solvent; subjecting the latter solution to the treatment of a deodorization reagent selected from the group consisting of ketene and acetic anhydride, the latter being present in amounts of from 0.1 percent to about 10 percent by weight based on cyanuric chloride; and thereafter recovering cyanuric chloride substantially free from obnoxious and offensive odors.

2. The process according to claim 1, in which the deodorization reagent is ketene.

3. The process according to claim 1, in which the deodorization reagent is acetic anhydride.

4. The process according to claim 1, in which the inert organic solvent is acetone.

5. The process according to claim 1, in which the inert organic solvent is carbon tetrachloride.

6. The process according to claim 1, in which the inert organic solvent is benzene.

No references cited.